(12) United States Patent
Benedict et al.

(10) Patent No.: US 7,669,678 B2
(45) Date of Patent: Mar. 2, 2010

(54) TEXTURED ALL-TERRAIN VEHICLE FENDERS

(75) Inventors: Timothy W. Benedict, Thief River Falls, MN (US); Ole E. Tweet, Thief River Falls, MN (US)

(73) Assignee: Arctic Cat Inc., Thief River Falls, MN (US)

(*) Notice: Subject to any disclaimer, the term of this patent is extended or adjusted under 35 U.S.C. 154(b) by 986 days.

(21) Appl. No.: 11/018,516

(22) Filed: Dec. 20, 2004

(65) Prior Publication Data

US 2006/0131827 A1   Jun. 22, 2006

(51) Int. Cl.
*B62D 25/18* (2006.01)

(52) U.S. Cl. ............ 180/89.1; 296/198; 296/181.2; 296/901.1; 280/304.4; 280/848; 280/850

(58) Field of Classification Search ......... 180/89.1, 180/311; 296/198, 181.2, 901.01; 280/304.3, 280/304.4, 848–850, 770
See application file for complete search history.

(56) References Cited

U.S. PATENT DOCUMENTS

| | | | | |
|---|---|---|---|---|
| 1,788,151 A * | 1/1931 | Danzig | .................. | 72/379.2 |
| 2,319,936 A * | 5/1943 | Lyon | ..................... | 280/850 |
| 3,627,073 A * | 12/1971 | Grimm | .................. | 180/271 |
| 3,990,206 A * | 11/1976 | Reusser | ................ | 52/534 |
| 4,068,859 A | 1/1978 | Dittman | | |
| 4,592,342 A * | 6/1986 | Salmasian | ............... | 128/898 |
| 4,685,530 A | 8/1987 | Hara | | |
| 4,825,812 A * | 5/1989 | Visalli et al. | ............... | 119/64 |
| 5,490,549 A | 2/1996 | Biette | | |
| 5,511,822 A | 4/1996 | Wolanski | | |
| 6,070,908 A * | 6/2000 | Skrzypchak | ............... | 280/847 |
| 6,224,134 B1 * | 5/2001 | Johnson et al. | ............ | 296/75 |
| 6,416,112 B1 * | 7/2002 | Trivits | ................ | 296/136.07 |
| 6,439,649 B1 * | 8/2002 | Lorenzo et al. | ......... | 296/181.3 |
| 6,547,027 B1 | 4/2003 | Kalhok et al. | | |
| 6,699,419 B1 * | 3/2004 | Kia et al. | ................ | 264/219 |
| 6,733,038 B1 * | 5/2004 | Prather | .................. | 280/770 |
| 6,794,013 B1 * | 9/2004 | Iacovelli et al. | ............ | 428/120 |
| 6,874,590 B2 | 4/2005 | Rondeau et al. | | |
| 6,955,203 B2 * | 10/2005 | Stancill | ................... | 157/1.3 |
| 2002/0047257 A1 * | 4/2002 | Rondeau et al. | ............ | 280/849 |

\* cited by examiner

*Primary Examiner*—Ruth Ilan
(74) *Attorney, Agent, or Firm*—Black Lowe & Graham PLLC

(57) ABSTRACT

The present disclosure describes an all terrain straddle-type vehicle for carrying a load including a rider. The vehicle includes a frame, a plurality of wheels, a rear fender, a front fender, and a body panel. The wheels, including front and rear wheels coupled to the frame. The fenders are secured to the frame for covering the wheels. The fenders are formed from a plastic material having a smooth portion and a textured portion thereon. The smooth and textured portions are disposed adjacent to one another and formed integrally on the fender. The textured portion is positioned on the fender in a location of frequent rider or other load contact. The body panel is secured to the frame forward of the rear fender. The body panel includes a textured portion situated in a location of frequent rider contact. A method of manufacturing a fender is also disclosed.

12 Claims, 3 Drawing Sheets

TEXTURED ALL-TERRAIN VEHICLE FENDERS

FIELD OF THE INVENTION

This invention relates generally to body fenders for all-terrain vehicles and, more specifically, to fender having textured regions in high scuff areas to protect against scratches.

BACKGROUND OF THE INVENTION

All-terrain vehicles (ATVs) commonly have plastic body fenders surrounding the wheels and adjacent the seating area. These areas are subject to scratches due to being rubbed by a user. For example, as the user mounts or dismounts the ATV, his or her leg and/or boot will typically rub against the forward portion of one of the rear-wheel fenders. Rubbing also commonly occurs during riding. Such rubbing often causes slight scratching on the shiny, smooth, polyethylene surface. The surfaces are attractive in their smooth state when untouched. However, before the vehicles even have a chance to leave the showroom floor, they may receive many marring scratches. These make the vehicle look somewhat used and less appealing to a buyer. The value of the ATV is reduced whether at the dealer or consumer.

Manufacturing reject rates on such molded parts are also high. The manufactured parts must be handled with increased care, also increasing manufacturing costs.

ATV body panels, such as fenders are constructed of thermoplastic materials, such as polyethylene, polypropylene, and TPR. Such polymers may be molded to a desired body shape and they are extremely durable: they do not easily break or tear. They also can be formed with smooth, high-gloss surfaces. However, due to the relative softness of these materials they also scratch easily such that the surface finish may be ruined.

Current methods of dealing with scratches on ATV body panels are directed to use of lighter colors for the molded plastic panel. Lighter colors tend to hide the scratches somewhat. However, a lighter color is not always desirable. Furthermore, the scratches can still be seen upon close inspection.

SUMMARY OF THE INVENTION

The present invention provides a body panel, such as a fender or side panel, for a straddle-ridden type vehicle, such as an ATV. The panel includes a smooth exterior portion and a textured exterior portion. The textured exterior portion is adjacent the smooth portion. The textured portion is located in areas of frequent rider contact on the vehicle. The smooth exterior portion and the textured portion are integrally part of the same body panel.

In one aspect of the invention, the smooth exterior portion and the textured exterior portion both are a part of the ATV fender. The textured portion is situated on the fender in a location of frequent rider contact. Preferably, the vehicle also includes a textured exterior portion situated generally forward of a seating location of the vehicle.

In a further aspect of the invention, the fender is a rear fender formed of thermoplastic material.

In still a further aspect of the invention, the vehicle is configured for carrying the load. The textured exterior portion is situated on the body panel in a location of frequent vehicle load contact.

The invention may also be described as a plastic fender for an all-terrain vehicle. The fender includes a smooth exterior portion and a textured portion adjacent the smooth portion. The textured portion is disposed in a wear area of the fender. The smooth portion and the textured portion are integrally formed. Preferably, the textured portion is situated on a top and forward portion of the fender.

In one preferred embodiment, a front fender also includes textured and smooth portions.

A method of manufacturing a fender for a straddle-ridden type vehicle is also disclosed. The vehicle is configured for hauling a load including at least a rider. The method includes molding a plastic panel with a smooth portion adjacent a textured portion. The textured and smooth portions are integrally formed in the same mold. The textured portion is situated on the fender in a load contact location.

In one preferred aspect of the method, the fender is a rear fender. The textured portion is situated in a position for frequent contact with the leg and/or footwear of the rider on the forward portion of the rear fender. Also in a preferred embodiment, a side panel of the vehicle includes a textured portion in an area of frequent rider contact.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
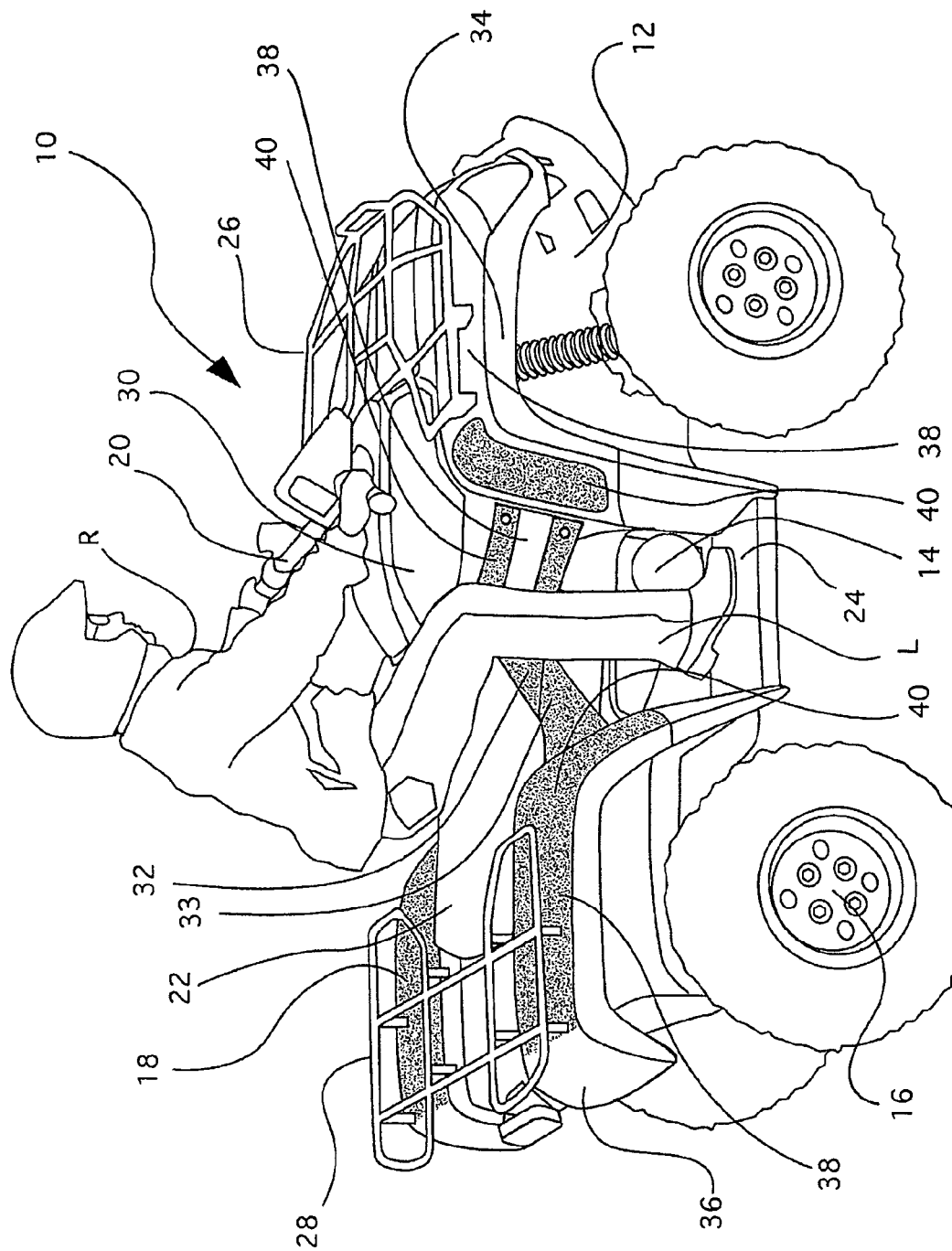
FIG. 1 is a perspective view of an ATV of the present invention shown with a rider thereon.

The present invention provides textured body panels for all-terrain vehicles (ATVs) where smooth portions and textured portions are molded into the panels integrally. Thus, the smooth glossy appearance of the ATV is maintained while providing selected textured areas that resist marring, scratches, and other damage due to contact with the rider or load, or even contact with other objects such as brush or sticks. The textured areas, being molded jointly with the smooth areas, present a pleasing appearance to the consumer. The retailer is able to show the all-terrain vehicles, without applying an external protective plastic layer and without excessively limiting the close examination of the vehicle by perspective buyers. The showroom appearance of the vehicle is also lengthened after purchase.

The figures illustrate the portions that may preferably be textured and smooth on an ATV. An ATV 10 includes a frame 12, an engine 14, wheels 16, and a body 18. The frame is the main structure of the ATV and supports the various components. Engine 14 is secured in a mid portion of the frame. Wheels 16 are secured with suspensions leading to frame 12. Body 18 is also secured to frame 12. Body 18 includes side panels 30, 32, and 33 to enhance the user's protection and comfort as well as fenders 34, 36 to protect rider R from debris thrown up by wheels 16.

As seen in FIG. 1, the rider interface with ATV 10 is primarily through handlebars 20, seat 22, and footwell 24. Handlebars 20 extend upwardly from within frame 12 and are interlinked with steering spindles to steer the front wheels of ATV 10. Seat 22 is secured above engine 14 on frame 12. Seat 22 may be positioned slightly aft of center, although a portion of seat 22 may extend forward of center. Footwell 24 is formed below seat 22 on the right and left sides of engine 14 providing a natural and ergonomic location for rider R to position his or her legs and feet. Handlebars 20, seat 22, and footwell 24 are all designed to resist scratches or marring due to contact with rider R.

A load may also be secured to ATV 10. Front and rear racks 26 and 28 respectively, are provided for this purpose. These racks are secured to frame 12 through body 18. The racks generally are adaptable to secure various different types of loads. However, some loads may contact different portions of body 18 depending on how they are secured and the type of load secured. Alternatively, ATV 10 may not include any racks or may include a box or second seat for an additional passenger. The "load" discussed herein refers to items carried on the ATV. Broadly, the "load" also includes the rider.

Body 18 is subject to scratches and other marring and visual damage from rider R or the various other loads secured to ATV 10. Body 18 includes upper side panel 30, lower side panel 32, rear side panel 33, front fenders 34, and rear fenders 36. The panels and fenders on the right and left sides of ATV 10 are substantially the same, although openings for various components such as the fuel tank or the transmission control lever may necessitate slight variations. Upper side panel 30 is situated below handlebars 20 and in front of seat 22. This panel is typically positioned out of major contact with either the rider or other loads. However, lower side panel 32 and rear side panel 33 receive frequent repeated contact with the rider's leg L. This is a region adjacent the knee of the rider. The rider may be comfortable having his or her knees rest against lower side panels 32 during regular riding. Alternatively, during active riding, the knee and leg may frequently rub against this portion and against rear side panel 33, which extend between seat 22, front fender 34, and rear fender 36. This portion is typically slightly above the crank case of engine 14. Lower side panel 32, in one alternate embodiment, is formed integrally with upper side panel 30, rear side panel 33, or front fender 34 or all three. Preferably, but not necessarily, it is formed separately as a separate panel. Rear side panel 33 is preferably formed integrally with rear fender 36.

Both the right and left sides of front fender 34 and upper side panel 30 are preferably formed integrally. Alternatively, these panels and fenders are formed separately or in any combination. Front fender 34 extends upwardly from footwell 24 then forwardly to surround a headlight. Frame 12 supports front fender 34 and also front rack 26 above front fender 34. Thus, front fender 34 includes a steep rearward section, with a transition section leading to an upper, more horizontal portion. Front fender 34 also includes an outer downwardly extending flange such that somewhat of an inverted cup shape is formed well over the top of the front wheel.

Rear fender 36 is similar in form. It is formed behind footwell 24 and extends upwardly to a transition portion, it then curves to a more horizontal portion, then downwardly at a rear portion. It also includes a downwardly extending side flange to create an overall cupping effect over the top of the rear wheels. Rear fender 36 is preferably formed integrally with its right and left sides or it may be separately formed. Rear rack 28 is secured to frame 12 through rear fender 36.

Figure 2:
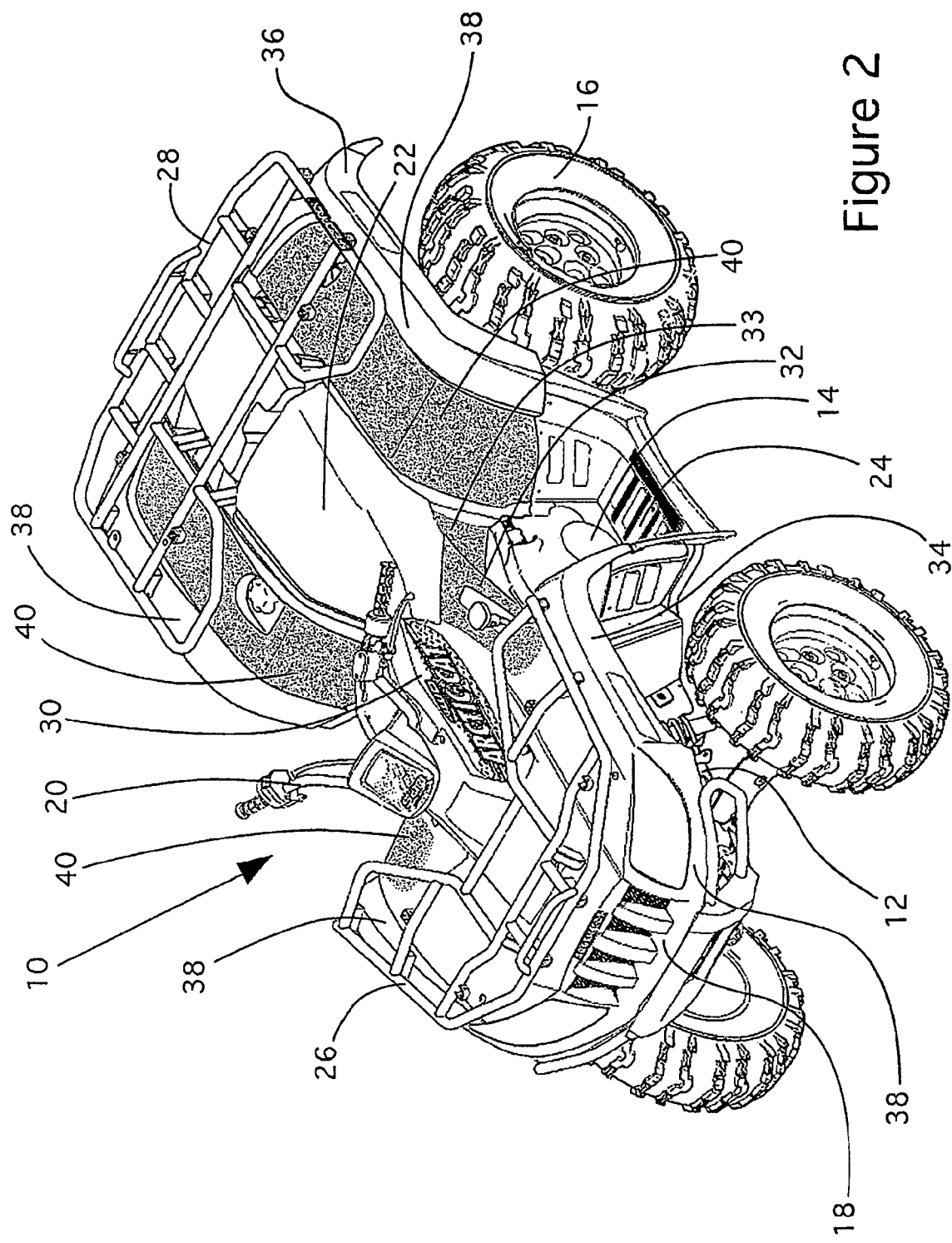
FIG. 2 is an isometric view of an ATV of the present invention, showing the left side thereof.

In the preferred embodiment, lower side panel 32 and rear fender 36 are provided with smooth portions 38 and textured portions 40. In one alternate embodiment, front fender 34 is also provided with integrally formed smooth and textured portions, 38 and 40. FIG. 2 illustrates the preferred placement of textured portions 40 and smooth portions 38 on rear fenders 36. Textured portions 40 are placed in an area that may encounter a large amount of leg and/or footwear contact from rider R or of load contact from the load being held on rear rack 28. This portion is inboard of an outer section of rear fender 36 that includes a smooth portion 38. The smooth and textured portions are both integrally formed in the same mold. The mold includes textured surface portions in the regions that are to be textured on the final fender product. The textured portion, preferably, extends downwardly to its inner connection with footwell 24. It extends upwardly and rearwardly under rear rack 28 to a rear portion of rear fender 36.

Figure 3:
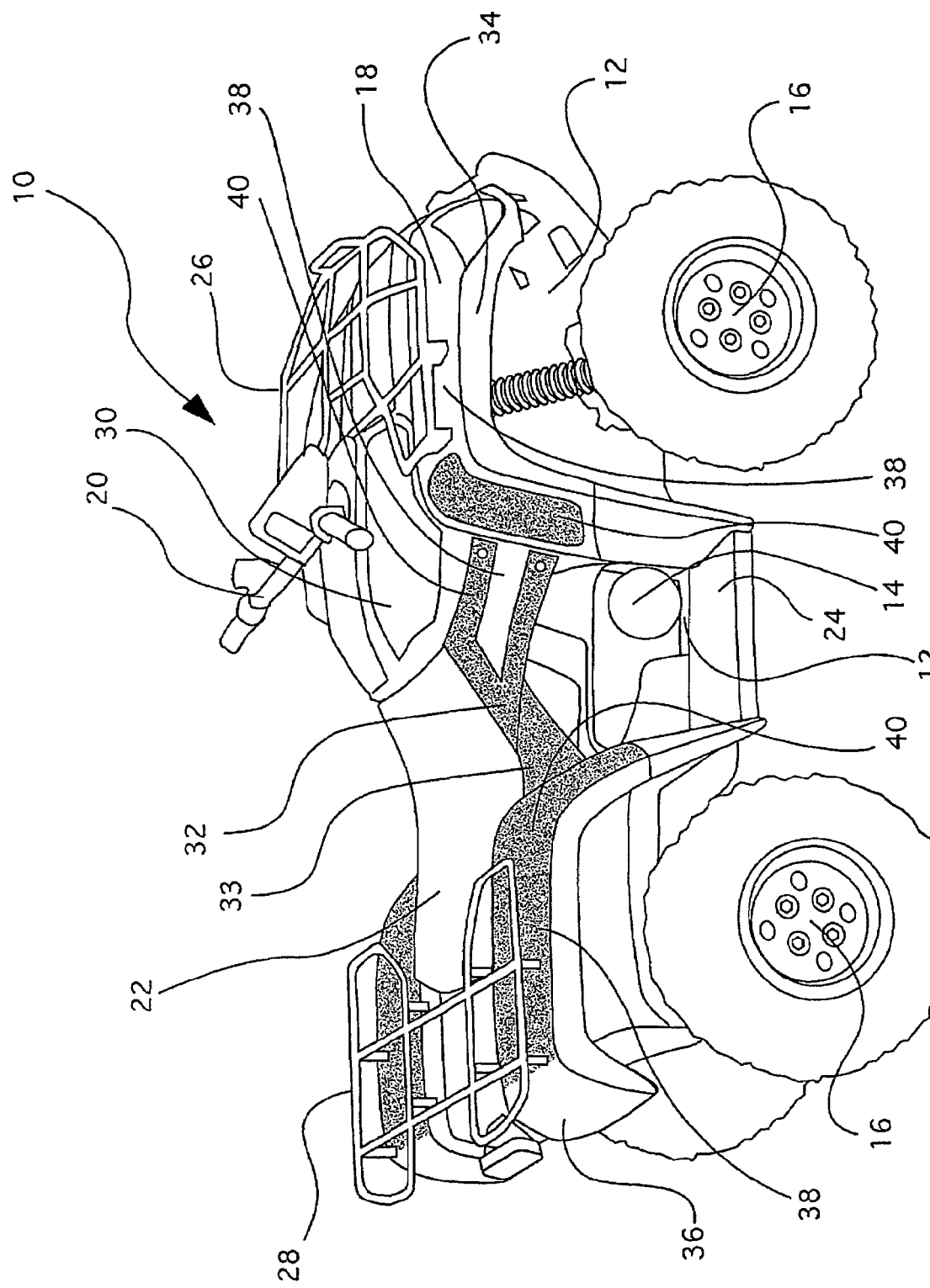
FIG. 3 is a perspective view showing the right side of an ATV of the present invention.

The textured and smooth portions 38 and 40 on lower side panel 32 and rear panel 33 are best illustrated in FIG. 3. Lower side panel 32 forms in somewhat of a trapezoidal shape from seat 22 to front fender 34. The textured portion 40 forms somewhat of a "C"-shape with smooth portion 38 being nested and recessed within the "C". Thus, textured portion 40 on lower side panel 32 receives most of the contact with the leg of rider R. Smooth portion 38 is provided to create a pleasing visual contrast and for a clean smooth appearance of ATV 10.

FIG. 3 also best illustrates a preferred placement of textured portion 40 on front fender 34. Texturing is placed in a region above footwell 24 between upper and lower side panels 30 and 32 and an outer raised portion of front fender 34.

While the preferred embodiment of the invention has been illustrated and described, as noted above, many changes can be made without departing from the spirit and scope of the invention. For example, textured portions may be created in other regions of body 18, such as the outer sides of the fenders. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A body panel for a straddle-ridden type vehicle for use by a rider wherein the rider comes in frequent contact with the body panel during use, the panel comprising:
   a. a smooth exterior portion; and
   b. a textured exterior portion adjacent said smooth portion, said textured portion being positionable adjacent the leg of the rider in a frequent rider contact zone of the vehicle, wherein said smooth exterior portion and said textured exterior portion are formed of the same unitary body panel, said textured portion being molded unitarily with said smooth portion.

2. The body panel of claim 1, wherein said smooth exterior portion and said textured exterior portion both comprise a portion of a fender.

3. The body panel of claim 2, wherein said textured exterior portion is situated on said fender in a location of frequent rider leg contact.

4. The body panel of claim 3, wherein the vehicle is an all-terrain vehicle having a seat, said fender being a rear fender, said textured portion being a portion of the fender adjacent the seat.

5. The body panel of claim 3, wherein the vehicle is an all-terrain vehicle, said fender being a front fender, said textured portion being a portion of the front fender adjacent the front of the leg of the rider.

6. The body panel of claim 3, wherein said fender is formed of a plastic material.

7. The body panel of claim 1, wherein said textured exterior portion is situated on said body panel in a location of frequent rider leg and knee contact.

8. The body panel of claim 7, wherein said textured exterior portion is situated generally beneath and forward of a seating location of the vehicle.

9. The body panel of claim 7, wherein the vehicle is an all-terrain vehicle.

10. The body panel of claim 1, wherein the vehicle is configured for carrying a load, said textured exterior portion extending to location of frequent vehicle load contact.

11. The body panel of claim 10, wherein the vehicle is an ATV and wherein said smooth exterior portion and said textured exterior portion both comprise a portion of a fender.

12. The body panel of claim 11, wherein said fender is formed of a plastic material.

* * * * *